Figure 1:
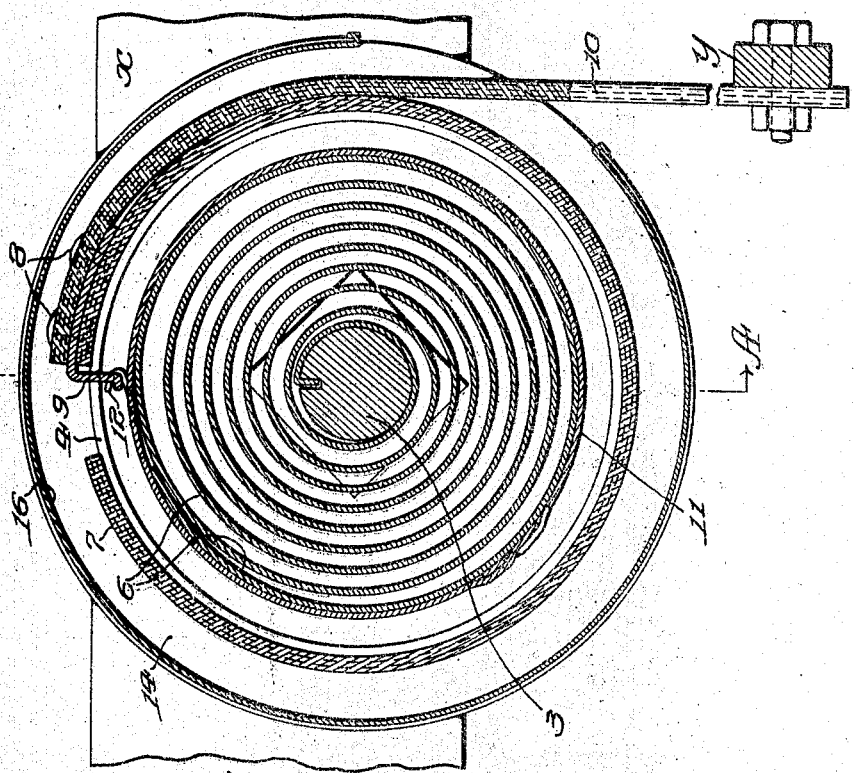

Dec. 15, 1925.　　　　　　　　　　　　　　　　1,565,835
J. W. WATSON
MOTION CONTROLLING MECHANISM
Filed April 19, 1920　　2 Sheets-Sheet 1

INVENTOR
John Warren Watson.

WITNESS
F. J. Hartman.

BY
ATTORNEYS

Dec. 15, 1925.　　　　　　　　　　　　　　　　1,565,835
J. W. WATSON
MOTION CONTROLLING MECHANISM
Filed April 19, 1920　　　2 Sheets-Sheet 2

INVENTOR
John Warren Watson

WITNESS
F. J. Hartman

BY
Blount, Moulton Hilbirt
ATTORNEYS

Patented Dec. 15, 1925.

1,565,835

UNITED STATES PATENT OFFICE.

JOHN WARREN WATSON, OF WAYNE, PENNSYLVANIA.

MOTION-CONTROLLING MECHANISM.

Application filed April 19, 1920. Serial No. 374,806.

*To all whom it may concern:*

Be it known that I, JOHN WARREN WATSON, a citizen of the United States, and a resident of Wayne, in the county of Delaware and State of Pennsylvania, have invented certain new and useful Improvements in Motion-Controlling Mechanism, of which the following is a specification, reference being had to the accompanying drawings.

This invention relates to a novel combination for controlling, regulating or checking relative movement in one direction between any two elements, and in particular relates to that class of mechanism intended to check the too rapid separation between the sprung and unsprung portions of a vehicle and, in particular, a motor vehicle.

A particular object of my invention is to provide a spring-controlled friction mechanism, so constructed and arranged as to make it possible to transmit the power of the main spring in a direct manner to one of the co-acting friction members. In spring-controlled friction mechanisms of the drum and friction band type, it has heretofore been customary to use a single drum and when the spring is positioned within the drum, to transmit the power of this spring to the friction band by means of an arm, or equivalent structure, extending out and around the edge of the drum. Such a construction as the above is necessarily awkward and costly, and it is, therefore, the object of this invention to provide a structure such as will permit the power of the spring to be transmitted directly to one of the co-acting friction members, in the present instance a friction band, without going out and around the edge of the drum.

To accomplish this, in the embodiment shown, I use a split drum, or, rather, a double drum. This construction and arrangement of parts, as is clearly shown by the accompanying drawings, obviates the necessity of transmitting the power of the spring, to the friction band, by any indirect or tortuous ways and makes it possible to transmit this power in a direct way.

This direct application of the power of the spring, as is made possible, in the present embodiment, by a split or double drum arrangement, marks a decided improvement in the art as many parts are thereby rendered unnecessary and a much more simple, fool-proof, and lasting device is produced. As, by this improvement all forces and resistance to those forces lie in a single plane, all twisting strains and binding tendencies are at once eliminated, smoother action is obtained, and any wear on the parts is thereby reduced to a minimum.

Various combinations of elements and different means could be readily employed to obtain the results secured by the mechanism disclosed without departing from the spirit and scope of this invention, the illustrations herewith being merely by way of example.

Figure 2:
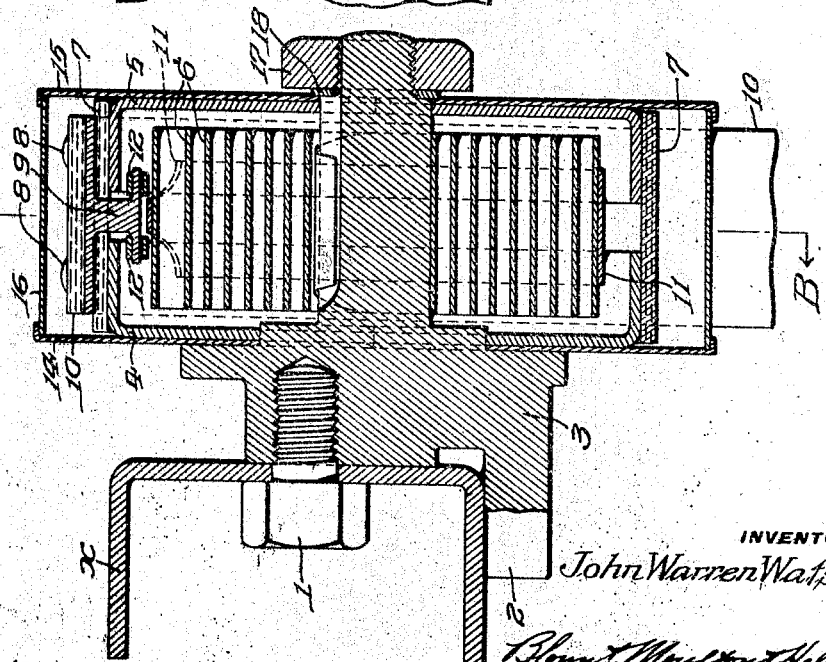
Figure 3:
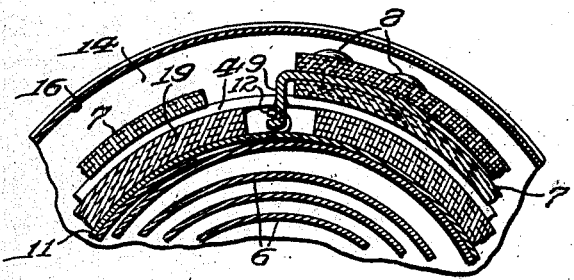
Figure 4:
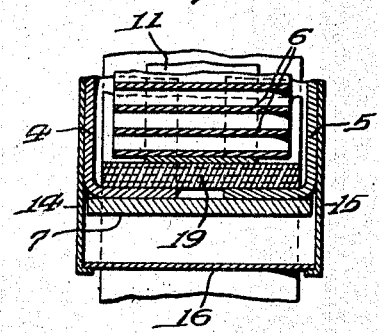
Figure 7:
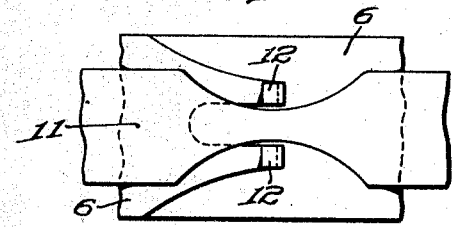
Figure 6:
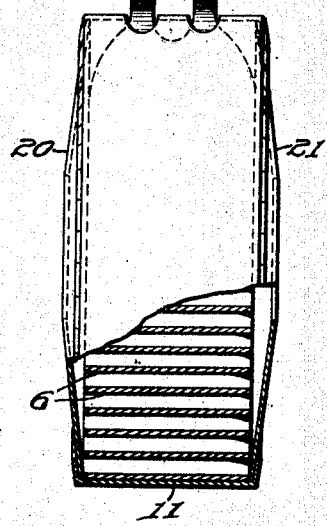
Figure 5:
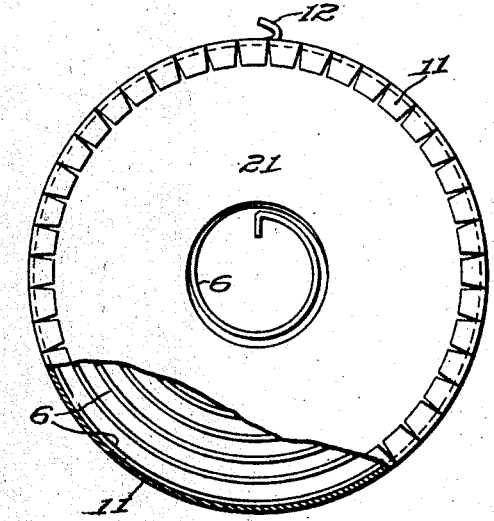

One embodiment of this invention is shown by the accompanying drawings in which Fig. 1 is a sectional view on line BB Fig. 2. Fig. 2 is a sectional view on line AA Fig. 1. Figs. 3 and 4 are fragmentary views corresponding to Figs. 1 and 2, respectively, showing a modification to the extent of adding, if such addition is required, a bushing or liner between the band 11 and the drums 4 and 5. The employment of this bushing or liner may be found advantageous for the purpose of maintaining band 11, or some portion of spring 6, out of rubbing contact with the drums, or such employment may be found advantageous for the purpose of more completely housing spring 6 from grit or moisture. Figs. 5 and 6 illustrate two views, each partly in section, of another means for housing the spring against grit or moisture, and this or some other similar means might also prove advantageous for the purpose of maintaining in place any grease or other lubricant which it might be found advisable to pack with the spring. Fig. 7 is a fragmentary top plan view showing in detail a portion of band 11 and hooks 12—12.

Referring to Fig. 1, X and Y represent relatively movable elements, whose motion, one relative to the other, it is desired to check, regulate or control. These elements are illustrated merely diagrammatically for the purpose of indicating that this invention may be applied and utilized in connection with various combinations of elements which move, one relatively to the other, and whose movement it is desired to effectively control.

Attached to element X by any suitable means, such as, for example, by cap screw 1, and kept from turning with relation to elements X by means of a stud 2, is a member 3 of irregular form which acts to support drums 4 and 5 and spring 6. By any suitable means, such as, for example, by squared portions being formed on member 3, and corresponding squared openings being formed in the sides of drum members 4 and 5, these drum members are held against rotation with relation to member 3 and hence also with relation to element X. Rotably mounted on the outer peripheries of drums 4 and 5 is a friction member 7. Attached to this friction member 7, as, for example, by means of rivets 8, is a member 9 which serves as a connection between spring 6 and member 7. Also attached to member 7, as for example by means of rivets 8, is a flexible member or strap 10 which is adapted for attachment also to element Y. Fastened around spring 6 in any suitable manner, such as, for example, by having its ends so formed as to hook into each other, is a retaining band 11 which has for its object to facilitate the assembly of spring 6 within the drums 4 and 5, and which also serves to maintain spring 6 within pre-determined limits, and hence out of contact with the inner peripheries of drums 4 and 5, regardless of the extent to which spring 6 may be wound up or unwound. The inner convolution of spring 6 is held in fixed relation with the barrel portion of member 3 by any suitable means, such as for example, by hooking into a slot suitable formed in such latter member. The outer end of spring 6 is also provided with hooks 12—12 which extend beyond band 11 and serve to connect the spring with member 9. Members 14 and 15 are, by spot welding or by other suitable means, held fast to members 4 and 5, respectively. These members 14 and 15, in conjunction with cover member 16, act to house the entire mechanism and also act to maintain a pre-determined separation, or space, between drum members 4 and 5. Nut 17 and lock washer 18 serve to hold and maintain the parts in position.

Referring to Figs. 3 and 4, the bushing or liner 19, two purposes for which have already been outlined, may be made in the form of a complete ring or a split ring, or may be made in the form of only some portion of a ring, depending upon whether it is desired or necessary to maintain all of band 11 or only some portion of the band away from rubbing contact with the inner peripheries of drums 4 and 5.

Referring to Figs. 5 and 6, it will be seen that band 11 has been made to extend beyond each side of spring 6 and has been cut out to permit the band to be crimped over side members 20 and 21. Thus crimping the band over these side members provides a means for housing grease or other lubricant as above outlined.

As attached in the present instance to elements X and Y, it will be readily understood, by those skilled in the art, that as elements X and Y are caused to approach each other, spring 6 will immediately act to rotate friction member 7 around the drums 4 and 5 and thus keep taut the strap 10, and as elements X and Y are caused to separate, frictional resistance to such separation is set up between member 7 and drums 4 and 5 because of the facts that the movement of member 7 around the drums is resisted at one end by the power of spring 6. The power of spring 6 may be variously adjusted by loosening the nut 17, pulling out member 3 a sufficient distance to disengage the squared portions on member 3 from the squared holes in members 4 and 5, turning member 3 either forward or backward one or more revolutions, and then again registering member 3 back in the squared holes in the drum members 4 and 5. In order to provide adjustments finer than are given by complete revolutions of members 3, a plurality of slots may be suitably formed on the barrel portion of member 3. In this way the fineness of adjustment is limited only by the number of such slots.

I have illustrated and described a preferred form of construction for carrying into effect my invention, which primarily consists in making it possible to transmit the power of the main spring, in a spring-controlled friction mechanism, in a direct non-tortuous manner to one of two co-acting friction members. While this form of construction illustrates the use of a double drum for carrying this invention into effect, and while this double drum arrangement is illustrated in connection with only one type of spring-controlled friction mechanism, it will nevertheless be understood that variations and modifications may be employed without departing from the spirit and scope of the invention, which broadly discloses, in mechanism of the nature herewith, means for the transmission of power through a supporting member to a member supported by said member for rotating said supported member with relation to said supporting member, and which also broadly discloses, by separating or dividing the friction surface portion of at least one of two radially mounted and relatively rotatable frictionally opposed members, means for the transmission of power through and beyond the friction surface portion of one of said members to relatively rotate said members without setting up twisting or cramping tendencies as a result of the application of the power and without the necessity of supporting means other than the friction surfaces themselves. In connection with spring-controlled friction mechanisms of the drum and band type, or in connection with spring-controlled friction mechanisms of types employing members which are the equivalent of a drum and band, it is believed that this idea of providing a direct, non-tortuous connection for the transmission of power to one of the co-acting friction members, and the many advantages resulting from such provision, is entirely new, and I, therefore, desire to avail myself of such variations and modifications as come within the scope of the appended claims.

Having thus described my invention, what I claim and desire to protect by Letters Patent of the United States is:

1. In mechanism for retarding motion in one direction between two relatively movable elements, a plurality of coaxially arranged drums adapted to be secured to one of said elements, a friction member in contact with said drums and adapted to be secured to said other element, and a spring so associated with one of said drums and said friction member as to tend to relatively move them in one direction.

2. In mechanism for retarding motion in one direction between two relatively movable elements, a plurality of coaxially arranged drums adapted to be secured to one of said elements, a friction member in contact with said drums and adapted to be secured to said other element, and a spring so associated with one of said drums and said friction member as to resist their relative movement in one direction.

3. In mechanism for retarding motion in one direction between two relatively movable elements, a plurality of coaxially arranged drums adapted to be secured to one of said elements, a friction member in contact with said drums and adapted to be secured to said other element, and a spring so associated with one of said drums and said friction member as to tend to relatively move them in one direction and resist their relative movement in another direction.

4. In mechanism for retarding motion in one direction between two relatively movable elements, a plurality of drums adapted to be secured to one of said elements, a friction member in contact with one of said drums and adapted to be secured to said other element, a spring having one of its ends in fixed relation with one of said drums, and means extending between two of said drums and connecting said spring to said friction member.

5. In mechanism for retarding motion in one direction between two relatively movable elements, two drums adapted to be secured to one of said elements, a friction member in contact with said drums and adapted to be secured to said other element, and a spring so arranged as to transmit its power between said drums to said friction member.

6. In mechanism for retarding motion in one direction between two relatively movable elements, two drums adapted to be secured to one of said elements, a friction member in contact with said drums and adapted to be secured to said other element, a spring so arranged as to transmit its power between said drums to said friction member, and means to maintain said spring within pre-determined limits regardless of the extent to which said spring may be wound up or unwound.

7. In mechanism for retarding motion in one direction between two relatively movable elements, two coaxially arranged drums adapted to be secured to one of said elements, a friction member in contact with said drums and adapted to be secured to said other element, a spring so associated with said drums and said friction member as to tend to relatively move them in one direction, and means to maintain the outer end of said spring away from contact with said drums.

8. In mechanism for retarding motion in one direction between two relatively movable elements, two drums, a support for said drums adapted to be secured to one of said elements, a friction member in contact with said drums and adapted to be secured to said other element, and a spring so associated with said support and said friction member as to transmit power in a single plane, between said drums, from said support to said friction member.

9. In mechanism for retarding motion between relatively movable elements in one direction, two drums carried by one of said elements, a friction member in contact with said drums and adapted to be secured to said other element, and a spring so associated with said drums and said friction member as to increase the area of contact between said drums and said friction member as the elements approach each other.

10. In mechanism for retarding motion between relatively movable elements in one direction, two drums carried by one of said elements, a friction member in contact with said drums and adapted to be secured to said other element, a spring so associated with said drums and said friction member as to increase the area of contact between said drums and said friction member as the elements approach each other, and means to maintain said spring out of rubbing contact with said drums.

11. In mechanism for retarding motion between relatively movable elements in one direction, two drums carried by one of said elements, a friction member in contact with said drums and adapted to be secured to said other element, a spring so associated with said drums and said friction member as to increase the area of contact between said drums and said friction member as the elements approach each other, and means to maintain one end of said spring out of rubbing contact with said drums.

12. In mechanism for retarding motion between relatively movable elements in one direction, two drums carried by one of said elements, a friction member in contact with said drums and adapted to be secured to said other element, and a spring so connecting said drums to said friction member as to increase the area of contact between said drums and said friction member as the elements approach each other, said connection passing between said drums.

13. In mechanism for retarding motion between relatively movable elements in one direction, two drums carried by one of said elements, a friction member in contact with said drums and adapted to be secured to said other element, a spring so connecting said drums to said friction member as to increase the area of contact between said drums and said friction member as the elements approach each other, said connection passing between said drums, and means to maintain said spring within pre-determined limits regardless of the extent to which it may be wound up or unwound.

14. In mechanism for retarding motion between relatively movable elements in one direction, two drums carried by one of said elements, a friction member in contact with said drums and adapted to be secured to said other element, a spring so connecting said drums to said friction member as to increase the area of contact between said drums and said friction member as the elements approach each other, said connection passing between said drums, and means to maintain one end of said spring out of rubbing contact with said drums.

15. In mechanism for retarding motion between two relatively movable elements, two drums supported by, and in fixed relation with, one of said elements, a friction shoe in the form of a split ring in contact with said drums, a flexible member attached to said friction member and adapted to be secured to said other element, a spring having one of its ends in fixed relation with said first-mentioned element, means for connecting said spring with said friction member, said connecting means passing between said drums.

16. In mechanism for retarding motion between two relatively movable elements, two drums supported by, and in fixed relation with, one of said elements, a friction shoe in the form of a split ring in contact with said drums, a flexible member attached to said friction member and adapted to be secured to said other element, a spring having one of its ends in fixed relation with said first-mentioned element, means for connecting said spring with said friction member, said connecting means passing between said drums, and a band around said spring.

17. In mechanism for retarding motion between two relatively movable elements, two drums supported by, and in fixed relation with, one of said elements, a friction shoe in the form of a split ring in contact with said drums, a flexible member attached to said friction member and adapted to be secured to said other element, a spring having one of its ends in fixed relation with said first-mentioned element, means for connecting said spring with said friction member, said connecting means passing between said drums, a band around said spring, and a member for maintaining a portion of said spring away from contact with said drums.

18. In mechanism for retarding motion in one direction between two coaxially arranged and relatively movable elements, a plurality of relatively fixed drums adapted to be supported by one of said elements, a member, having a friction surface in contact with and supported by each of said drums and adapted to be secured to said other element, and a spring so associated with one of said drums and said friction member as to tend to relatively move them in one direction.

19. In mechanism for retarding motion in one direction between two coaxially arranged and relatively movable elements, a plurality of relatively fixed drums adapted to be supported by one of said elements, a member, having a friction surface in contact with and supported by each of said drums and adapted to be secured to said other element, and a spring so associated with one of said drums and said friction member as to resist their relative movement in one direction.

20. In mechanism for retarding motion in one direction between two relatively movable elements, a member supporting at least two drum-shaped flanges and adapted to be held with relation to one of said elements, a friction member in contact with one of said flanges and adapted to be secured to said other element, a spring connecting said first-mentioned member and said friction member, and means extending between said flanges to cause relative movement between said first-mentioned member and said friction member.

21. In mechanism for controlling the reaction of a vehicle spring, the combination of two frictionally opposed members, one of which is supported by the other, means for the transmission of power to rotate the supported member in one direction with relation to the supporting member, and means for the transmission of power to rotate the supported member in the opposite direction with relation to the supporting member, one of said means passing through the supporting member, and said supporting member lying transversely on both sides of said last-mentioned means at that portion of said supporting member through which said means passes.

22. In mechanism for controlling the reaction of a vehicle spring, the combination of a fixed member, a member rotatable with relation to said fixed member, and a power-transmitting member extending through the fixed member and secured to said rotatable member for rotating it, said rotatable member contacting frictionally with said fixed member transversely on both sides of said power-transmitting member at that portion of said fixed member through which said power-transmitting member passes.

23. In mechanism for controlling the reaction of a vehicle spring, the combination of a fixed member, a member rotatable with relation to said fixed member, and a power-transmitting member extending through the fixed member and secured to said rotatable member for rotating it, said rotatable member contacting frictionally with said fixed member on either side of a plane which is at right angles to the axis of said rotatable member and which passes through the power-transmitting member.

24. In mechanism for controlling the reaction of a vehicle spring, the combination of two relatively movable friction members, one of said members being substantially circular and having a slit around substantially its entire periphery to provide for the passage of a member operative to cause relative movement between said friction members.

25. In mechanism for controlling the reaction of a vehicle spring, the combination of two relatively rotatable friction members and a third member operative to relatively rotate said members, one of said friction members being provided with a slot dividing the friction surface of said member, said slot running around substantially the entire periphery of said last-mentioned member to provide for the passage of said third-mentioned member.

26. In mechanism for controlling a vehicle spring, the combination of two relatively revolvable friction members, one being supported by the other, a third member operative to relatively revolve said members, said third member passing through and beyond the friction surface portion of one of said friction members at a point in a plane substantially parallel with and lying between the extreme outside edges of the friction surface portion of said other friction member to prevent any twisting or cramping of parts as a result of the power transmitted by said third mentioned member.

27. In mechanism for controlling a vehicle spring, the combination of two relatively revolvable friction members, one being supported by the other, a third member operative to relatively revolve said members, said third member passing through and beyond the friction surface portion of one of said friction members at a point in a plane substantially parallel with and lying between the extreme outside edges of the friction surface portions of both of said friction members.

28. In mechanism for controlling a vehicle spring, the combination of two relatively rotatable frictionally opposed members of which one is provided with a pair of friction surfaces, and a member secured to said last-mentioned member and operative to relatively rotate said friction members in one direction and which passes between said pair of friction surfaces.

29. In mechanism for controlling a vehicle spring, the combination of two relatively rotatable frictionally contacting members and a third member secured to one of said members and operative to relatively rotate said members, one of said friction members contacting frictionally with said other friction member on opposite sides of said third member.

30. In mechanism for controlling the reaction of a spring, with decreasing resistance as said spring reacts, the combination of two contacting and relatively rotatable friction members and a third member secured to one of said members and operative to relatively rotate said friction members, one of said friction members having its friction surface divided to permit said third member to pass freely through the arc of said surface for a distance sufficient to permit the necessary relative rotation of said friction members.

31. In mechanism for controlling a vehicle spring, the combination of a stationary friction member, a rotatable friction member, means to rotate said last-mentioned member in one direction and means to rotate said last-mentioned member in the opposite direction, the friction surface of one of said friction members being provided with a slot which permits the passage of one of said means, said last-mentioned member lying transversely on both sides of said last-mentioned means at that portion of said member through which said means passes.

32. In mechanism for controlling the reaction of a spring, with decreasing resistance as said spring reacts, the combination of two frictionally opposed and relatively rotatable members and a third member secured to one of said members and operative to relatively rotate said members; one of said frictionally opposed members being provided with a slot to accommodate necessary movement of said third member; and one of said frictionally opposed members radially supporting said other frictionally opposed member on both sides of said slot.

33. In mechanism for controlling the reaction of a spring, with decreasing resistance as said spring reacts, the combination of two contacting and relatively rotatable friction members, and a third member secured to one of said members and operative to relatively rotate said members; one of said friction members being provided with a slot to accommodate necessary movement of said third member; and one of said friction members radially supporting said other friction amember on both sides of said slot.

In witness whereof, I have hereunto set my hand this seventeenth day of April, A. D. 1920.

JOHN WARREN WATSON.